(12) United States Patent
Kim et al.

(10) Patent No.: US 11,629,244 B2
(45) Date of Patent: Apr. 18, 2023

(54) THERMOPLASTIC RESIN COMPOSITION, CELLULOSE-REINFORCED THERMOPLASTIC RESIN COMPOSITION, METHOD OF PRODUCING CELLULOSE-REINFORCED THERMOPLASTIC RESIN COMPOSITION, MOLDED ARTICLE OF CELLULOSE-REINFORCED RESIN, AND METHOD OF PRODUCING MOLDED ARTICLE OF CELLULOSE-REINFORCED RESIN

(71) Applicant: FURUKAWA ELECTRIC CO., LTD., Tokyo (JP)

(72) Inventors: Jae Kyung Kim, Tokyo (JP); Takeshi Yagi, Tokyo (JP); Yasuo Nakajima, Tokyo (JP); Eiji Kozawa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 768 days.

(21) Appl. No.: 16/144,430

(22) Filed: Sep. 27, 2018

(65) Prior Publication Data
US 2019/0023882 A1 Jan. 24, 2019

Related U.S. Application Data

(63) Continuation of application No. PCT/JP2017/013024, filed on Mar. 29, 2017.

(30) Foreign Application Priority Data

Mar. 31, 2016 (JP) .............................. JP2016-073613

(51) Int. Cl.
C08L 23/06 (2006.01)
C08L 1/02 (2006.01)
C08K 5/14 (2006.01)
C08L 51/00 (2006.01)
C08L 101/12 (2006.01)

(52) U.S. Cl.
CPC ................ *C08L 23/06* (2013.01); *C08K 5/14* (2013.01); *C08L 1/02* (2013.01); *C08L 51/003* (2013.01); *C08L 101/12* (2013.01)

(58) Field of Classification Search
CPC .......... C08L 23/06; C08L 1/02; C08L 51/003; C08L 101/12; C08K 5/14
USPC ........................................................... 524/9
See application file for complete search history.

(56) References Cited

U.S. PATENT DOCUMENTS

| 3,645,939 | A | 2/1972 | Gaylord |
| 3,856,724 | A | 12/1974 | O'Connor et al. |
| 4,380,522 | A | 4/1983 | Georlette et al. |
| 2004/0214925 | A1 | 10/2004 | Sigworth |
| 2005/0288484 | A1 | 12/2005 | Holbrey et al. |
| 2006/0054058 | A1 | 3/2006 | Balliello |
| 2008/0146701 | A1 | 6/2008 | Sain et al. |
| 2008/0188636 | A1 | 8/2008 | Argyropoulos et al. |
| 2011/0086948 | A1 | 4/2011 | Hong et al. |
| 2012/0225976 | A1 | 9/2012 | Bampi |
| 2013/0001477 | A1 | 1/2013 | Kimura et al. |
| 2013/0209523 | A1 | 8/2013 | Ichikawa et al. |
| 2014/0073776 | A1 | 3/2014 | Shiramizu et al. |
| 2014/0336309 | A1 | 11/2014 | Sakata et al. |
| 2015/0105499 | A1 | 4/2015 | Yano et al. |
| 2016/0075877 | A1 | 3/2016 | Kaiser |
| 2017/0002182 | A1 | 1/2017 | Imai et al. |
| 2019/0023877 | A1 | 1/2019 | Kozawa et al. |
| 2019/0023882 | A1 | 1/2019 | Kim et al. |
| 2019/0031858 | A1 | 1/2019 | Kozawa et al. |
| 2021/0024722 | A1 | 1/2021 | Fujihashi et al. |

FOREIGN PATENT DOCUMENTS

| CN | 87108108 A | 8/1988 |
| CN | 102093734 A | 6/2011 |
| CN | 103360619 A | 10/2013 |
| CN | 104292412 A | 1/2015 |
| CN | 104761554 A | 7/2015 |
| CN | 108779310 A | 11/2018 |
| CN | 108834420 A | 11/2018 |
| CN | 108884328 A | 11/2018 |
| EP | 0 822 223 A1 | 2/1998 |

(Continued)

OTHER PUBLICATIONS

Britannica, The Editors of Encyclopaedia. "kraft process". Encyclopedia Britannica, Sep. 7, 2015, https://www.britannica.com/technology/kraft-process. Accessed Apr. 23, 2022. (Year: 2015).*
English translation of the International Search Report and Written Opinion of the International Searching Authority (forms PCT/ISA/210 and PCT/ISA/237), dated Jul. 4, 2017, for International Application No. PCT/JP2017/013023.
English translation of the International Search Report and Written Opinion of the International Searching Authority (forms PCT/ISA/210 and PCT/ISA/237), dated Jul. 4, 2017, for International Application No. PCT/JP2017/013024.
International Search Report and Written Opinion of the International Searching Authority (forms PCT/ISA/210 and PCT/ISA/237), dated Jun. 27, 2017, for International Application No. PCT/JP2017/013022, with an English translation of the International Search Report.

(Continued)

*Primary Examiner* — Ling Siu Choi
*Assistant Examiner* — Ronald Grinsted
(74) *Attorney, Agent, or Firm* — Birch, Stewart, Kolasch & Birch, LLP

(57) ABSTRACT

A thermoplastic resin composition, containing a thermoplastic synthetic resin, a cellulose in the content of 10 to 70 parts by mass with respect to 100 parts by mass of the thermoplastic synthetic resin, and an organic peroxide, in which the tensile strength of a resin composed of the thermoplastic resin composition measured in conformity with JIS K7161 is 40 MPa or more;
a cellulose-reinforced thermoplastic resin composition;
a molded article of a cellulose-reinforced resin; and
a method of producing a cellulose-reinforced thermoplastic resin composition or a molded article.

18 Claims, No Drawings

(56) References Cited

FOREIGN PATENT DOCUMENTS

| | | | |
|---|---|---|---|
| EP | 0897943 A2 | 2/1999 | |
| EP | 2 492 305 A1 | 8/2012 | |
| JP | 48-10612 B1 | 4/1973 | |
| JP | 55-131031 A | 10/1980 | |
| JP | 55131031 A | * 10/1980 | |
| JP | 62-39642 A | 2/1987 | |
| JP | 63-33448 A | 2/1988 | |
| JP | 9-316248 A | 12/1997 | |
| JP | 10-1575 A | 1/1998 | |
| JP | H101575 A | * 1/1998 | |
| JP | 2001-181513 A | 7/2001 | |
| JP | 3479661 B2 | 12/2003 | |
| JP | 2005-187524 A | 7/2005 | |
| JP | 2009-167250 A | 7/2009 | |
| JP | 2012-207063 A | 10/2012 | |
| JP | 2012-214563 A | 11/2012 | |
| JP | 2013-107987 A | 6/2013 | |
| JP | 2013-248824 A | 12/2013 | |
| JP | 2014-1361 A | 1/2014 | |
| JP | 2014-193959 A | 10/2014 | |
| JP | 2015-203093 A | 11/2015 | |
| JP | 2016-17096 A | 2/2016 | |
| JP | 2017-128717 A | 7/2017 | |
| JP | 2017-171698 A | 9/2017 | |
| KR | 10-1023928 B1 | 3/2011 | |
| WO | WO 03/029329 A2 | 4/2003 | |
| WO | WO 2011/118407 A1 | 9/2011 | |
| WO | WO 2013/133093 A1 | 9/2013 | |
| WO | WO 2015/039237 A1 | 3/2015 | |
| WO | WO 2015/053226 A1 | 4/2015 | |
| WO | WO 2015/111619 A1 | 7/2015 | |
| WO | WO 2015/152189 A1 | 10/2015 | |
| WO | WO 2017/141779 A1 | 8/2017 | |
| WO | WO 2017/170745 A1 | 10/2017 | |
| WO | WO 2017/170746 A1 | 10/2017 | |
| WO | WO 2017/170747 A1 | 10/2017 | |

OTHER PUBLICATIONS

Partial Supplemental European Search Report for European Application 17775280.5, dated Aug. 26, 2019.
Partial Supplemental European Search Report, dated Aug. 28, 2019, for European Application No. 17775281.3.
Extended European Search Report for European Application No. 17775279.7, dated Oct. 8, 2019.
Chinese Office Action and Search Report for Chinese Application No. 201780017867.X, dated Sep. 3, 2020, with English translation of the Office Action.
Chinese Office Action for Chinese Application No. 201780017841.5, dated Dec. 10, 2020, with English translation.
Japanese Office Action, dated Feb. 9, 2021, for Japanese Application No. 2018-509368, with an English machine translation.
Japanese Office Action, dated Feb. 9, 2021, for Japanese Application No. 2018-509369, with an English machine translation.
Japanese Office Action, dated Feb. 9, 2021, for Japanese Application No. 2018-509370, with an English machine translation.
Chinese Office Action and Search Report for Chinese Application No. 201780017841.5, dated Jul. 3, 2020, with English translation of the Office Action.
Chinese Office Action and Search Report for Chinese Application No. 201780018439.9, dated Aug. 26, 2020, with English translation of the Office Action.
Extended European Search Report for European Application No. 20170209.9, dated Sep. 15, 2020.
Chinese Office Action and Search Report for Chinese Application No. 201780017867.X, dated Apr. 6, 2021, with English translation.
Office Action dated Mar. 25, 2021 in corresponding Chinese Patent Application No. 201780017841.5, with English translation.
U.S. Office Action, dated Jun. 23, 2021, for U.S. Appl. No. 16/143,846.
U.S. Office Action, dated Jun. 24, 2021, for U.S. Appl. No. 16/144,304.
Chinese Office Action, dated Sep. 3, 2021, for Chinese Application No. 201780017867.X, with an English translation.
Chinese Office Action for Chinese Application No. 201780018439.9, dated Jun. 3, 2021, with English translation.
Office Action dated Jan. 7, 2022 in copending U.S. Appl. No. 16/144,304.
Chinese Office Action and Search Report for Chinese Application No. 201880063819.9, dated Jan. 24, 2022, with English translation.
Chinese Office Action and Search Report for Chinese Application No. 201880063823.5, dated Jan. 29, 2022, with English translation.
Chinese Office Action for Chinese Application No. 201780017867.X, dated Dec. 22, 2021, with English translation.
Chinese Office Action for Chinese Application No. 201780018439.9, dated Feb. 9, 2022, with English translation.
Chinese Office Action for Chinese Application No. 201880063819.9, dated Jun. 29, 2021.
Chinese Office Action for Chinese Application No. 201880063823.5, dated Jul. 5, 2021.
Chinese Office Action for Chinese Application No. 201880063825.4, dated Jan. 30, 2022, with English translation.
Chinese Office Action for Chinese Application No. 201880063825.4, dated Jul. 5, 2021.
Duan et al., "Natural Polymeric Materials," Huazhong University of Science and Technology Press, Wuhan, Jun. 2011, (6 pages total), with an English translation.
Extended European Search Report for corresponding European Application No. 18863337.4, dated May 11, 2021.
Extended European Search Report for European Application No. 18860137.1, dated Jun. 4, 2021.
Extended European Search Report for European Application No. 18860626.3, dated Jun. 4, 2021.
International Preliminary Report on Patentability and English translation of the Written Opinion of the International Searching Authority for International Application No. PCT/JP2018/036582, dated Mar. 31, 2020.
International Preliminary Report on Patentability and English translation of the Written Opinion of the International Searching Authority for International Application No. PCT/JP2018/036583, dated Mar. 31, 2020.
International Preliminary Report on Patentability and English translation of the Written Opinion of the International Searching Authority for International Application No. PCT/JP2018/036584, dated Mar. 31, 2020.
Machine Translation of JP-2012-207063-A, dated Oct. 25, 2012.
Suzuki et al., "Development of continous process enabling nanofibrillation of pulp and melt compounding," Cellulose, vol. 20, 2013, pp. 201-210.
U.S. Office Action for U.S. Appl. No. 16/833,222, dated Mar. 15, 2022.
U.S. Office Action for U.S. Appl. No. 16/143,846, dated Feb. 8, 2022.
U.S. Office Action for U.S. Appl. No. 16/832,986, dated Apr. 22, 2021.
U.S. Office Action for U.S. Appl. No. 16/832,986, dated Mar. 15, 2022.
U.S. Office Action for U.S. Appl. No. 16/832,986, dated Sep. 7, 2021.
U.S. Office Action for U.S. Appl. No. 16/833,071, dated Apr. 23, 2021.
U.S. Office Action for U.S. Appl. No. 16/833,071, dated Aug. 23, 2021.
U.S. Office Action for U.S. Appl. No. 16/833,071, dated Nov. 2, 2021.
U.S. Office Action for U.S. Appl. No. 16/833,222, dated Apr. 30, 2021.
U.S. Office Action for U.S. Appl. No. 16/833,222, dated Sep. 20, 2021.
Wang, "Principles and Applications of Polymer Blend Modification," China Light Industry Press, 2017, pp. 192-193 (6 pages total), with English translation.

(56) References Cited

OTHER PUBLICATIONS

U.S. Notice of Allowance for U.S. Appl. No. 16/143,846, dated Jun. 10, 2022.
U.S. Office Action for U.S. Appl. No. 16/144,304, dated Apr. 28, 2022.
European Communication pursuant to Article 94(3) EPC for European Application No. 17775281.3, dated Aug. 24, 2022.
Chinese Office Action for Chinese Application No. 201780018439.9, dated May 30, 2022, including an English translation.
Japanese Office Action for Japanese Application No. 2019-545198, dated May 30, 2022, including an English translation.
U.S. Notice of Allowance for U.S. Appl. No. 16/144,304, dated Nov. 9, 2022.
Office Action dated Feb. 17, 2023 in Chinese Patent Application No. 201780017841.5 with English translation.

* cited by examiner

THERMOPLASTIC RESIN COMPOSITION, CELLULOSE-REINFORCED THERMOPLASTIC RESIN COMPOSITION, METHOD OF PRODUCING CELLULOSE-REINFORCED THERMOPLASTIC RESIN COMPOSITION, MOLDED ARTICLE OF CELLULOSE-REINFORCED RESIN, AND METHOD OF PRODUCING MOLDED ARTICLE OF CELLULOSE-REINFORCED RESIN

CROSS-REFERENCE TO RELATED APPLICATIONS

This application is a Continuation of PCT International Application No. PCT/JP2017/013024 filed on Mar. 29, 2017, which claims priority under 35 U.S.C. § 119 (a) to Japanese Patent Application No. 2016-073613 filed in Japan on Mar. 31, 2016. Each of the above applications is hereby expressly incorporated by reference, in its entirety, into the present application.

FIELD OF THE INVENTION

The present invention relates to a thermoplastic resin composition, a cellulose-reinforced thermoplastic resin composition, a method of producing a cellulose-reinforced thermoplastic resin composition, a molded article of a cellulose-reinforced resin, and a method of producing a molded article of a cellulose-reinforced resin.

More specifically, the present invention relates to a cellulose-reinforced thermoplastic resin composition which has a high mechanical strength and is composed of a thermoplastic resin and a cellulose-reinforcing agent, a molded article of a cellulose-reinforced resin, and a method of producing these materials. Further, the present invention relates to a thermoplastic resin composition for obtaining a cellulose-reinforced thermoplastic resin.

BACKGROUND OF THE INVENTION

Cellulose fiber has excellent properties such as a light weight, a high strength, a high elastic modulus, and a low linear thermal expansion. Therefore, the cellulose fiber is widely known as a reinforcing material for resins and the like. However, the cellulose fiber is highly hydrophilic and therefore has a low affinity for resins having a high hydrophobic property, such as polypropylene, polyethylene, and the like, so that they cannot be mixed uniformly only by mechanically kneading them using a twin screw extruder or the like. Therefore, the mechanical properties of the obtained composite material were not always acceptable and were insufficient.

Generally, in a case of using a thermoplastic resin having a high hydrophobic property, such as polypropylene, polyethylene, and the like in the production of a molding material containing a cellulose fiber, a poor dispersion property of the cellulose fiber makes it very difficult to obtain a further mechanical strength.

To the forgoing problems, attempts are made to use a compatibilizer for improving a dispersion property of the cellulose in the resin, or to improve the dispersion property of the cellulose in the resin by subjecting the cellulose or the resin to a modification treatment with a modifier or the like (see Patent Literatures 1 to 4).

For example, Patent Literatures 1 and 2 propose to use an unsaturated dicarboxylic acid and/or its anhydride as a compatibilizer or an interface reinforcing agent in the resin composition composed of a cellulose-base material and polyolefin. Further, Patent Literature 3 proposes to use a polybasic acid anhydride as a hydrophobic modifier for a part of hydrogen groups of the micro-fibrillated cellulose and also to use the obtained hydrophobically modified cellulose fiber as a reinforcing material for the resin. Further, Patent Literature 4 proposes to improve a dispersion property of the cellulose by using a polyethylene grafted with a monomer including a carboxyl group having affinity to a hydroxyl group existing in the cellulose in accordance with a particular method.

By whatever methods described above, the reinforcement effect of the cellulose is obtained and a mechanical strength of the molded body is improved. However, further improvement of the mechanical strength has been desired.

CITATION LIST

Patent Literatures

Patent Literature 1: JP-A-62-39642 ("JP-A" means unexamined published Japanese patent application)
Patent Literature 2: US 2008/0146701
Patent Literature 3: JP-A-2012-214563
Patent Literature 4: Japanese Patent No. 3479661

SUMMARY OF THE INVENTION

Technical Problem

In view of the problems in the production method of the conventional cellulose-reinforced thermoplastic resin, the present invention is contemplated to provide: a thermoplastic resin composition which is capable of conveniently and uniformly dispersing cellulose in a resin having a high hydrophobic property and also is capable of improving a mechanical strength of the molded material that has been formed by molding the obtained resin composition; a cellulose-reinforced thermoplastic resin composition; and a molded article of a cellulose-reinforced resin.

Further, the present invention is contemplated to provide a method of producing such a cellulose-reinforced thermoplastic resin composition described above, and a method of producing a molded article of a cellulose-reinforced resin in simplicity and at a low cost.

Solution to Problem

As a result of intensive studies in order to solve the above-described problems, the present inventors improved a dispersion property by containing a cellulose fiber, a thermoplastic synthetic resin of the hydrophobic resin, and an organic peroxide in a resin composition, and then subjecting the resin composition to a heat kneading. As a result, it was found that a mechanical strength of the obtained molded material is improved to a great extent.

As a result of further studies based on the above-described findings, it was found that the above-described problems are achieved by the following constitutions.

(1) A thermoplastic resin composition, containing:
a thermoplastic synthetic resin;
a cellulose in the content of 10 to 70 parts by mass with respect to 100 parts by mass of the thermoplastic synthetic resin; and
an organic peroxide,
wherein the tensile strength of a resin composed of the thermoplastic resin composition measured in conformity with JIS K7161 is 40 MPa or more.
(2) The thermoplastic resin composition described in the above item (1), wherein the thermoplastic synthetic resin contains an unsaturated carboxylic acid- or its anhydride-graft modified polyolefin resin.
(3) The thermoplastic resin composition described in the above item (1) or (2), wherein the 1-minute half-life temperature of the organic peroxide is 130 to 190° C.
(4) The thermoplastic resin composition described in any one of the above items (1) to (3), wherein the organic peroxide is at least one kind of organic peroxide selected from a dialkyl peroxide, a peroxyketal, a diacylperoxide, an alkylperoxy ester and a monoperoxycarbonate.
(5) The thermoplastic resin composition described in any one of the above items (1) to (4), wherein the content of the organic peroxide is from 0.01 to 0.3 parts by mass with respect to 100 parts by mass of the thermoplastic resin.
(6) The thermoplastic resin composition described in any one of the above items (1) to (5),
wherein the thermoplastic synthetic resin contains an unsaturated carboxylic acid- or its anhydride-graft modified polyolefin resin; and wherein the unsaturated carboxylic acid- or its anhydride-graft modified polyolefin resin is a maleic anhydride-modified polyolefin resin.
(7) The thermoplastic resin composition described in any one of the above items (1) to (6), wherein the thermoplastic synthetic resin is a mixed resin of an unsaturated carboxylic acid- or its anhydride-graft modified polyolefin resin, and a polyolefin resin which is not modified with an unsaturated carboxylic acid or its anhydride.
(8) The thermoplastic resin composition described in any one of the above items (1) to (7), wherein the cellulose is plant fiber-derived cellulose.
(9) A cellulose-reinforced thermoplastic resin composition, containing an ester-linked composite resin in which a hydroxyl group of a cellulose and a polyolefin resin provided with a cross-linking structure having a carboxylic group are esterified,
wherein the content of the cellulose component in the composite resin is from 9.1 to 41% by mass, and
wherein the tensile strength of a resin composed of the cellulose-reinforced thermoplastic resin composition measured in conformity with JIS K7161 is 40 MPa or more.
(10) The cellulose-reinforced thermoplastic resin composition described in the above item (9), wherein the polyolefin resin provided with a cross-linking structure having a carboxylic group is a polyolefin resin provided with a cross-linking structure in which the carbon atoms in the main chain of an unsaturated carboxylic acid- or its anhydride-graft modified polyolefin and the carbon atoms in the main chain of a polyolefin resin which is not modified with an unsaturated carboxylic acid or its anhydride are bound at two or more sites.
(11) The cellulose-reinforced thermoplastic resin composition described in the above item (10), wherein a polyolefin resin prior to modification of the unsaturated carboxylic acid- or its anhydride-graft modified polyolefin resin and the polyolefin resin which is not modified with an unsaturated carboxylic acid or its anhydride are a different polyolefin resin from each other.
(12) The cellulose-reinforced thermoplastic resin composition described in any one of the above items (9) to (11), wherein the cellulose is plant fiber-derived cellulose.
(13) A method of producing a cellulose-reinforced thermoplastic resin composition, containing subjecting the thermoplastic resin composition described in any one of the above items (1) to (8) to a heat kneading, thereby reacting components contained therein.
(14) A molded article of a cellulose-reinforced resin, containing an ester-linked composite resin in which a hydroxyl group of a cellulose and a polyolefin resin provided with a cross-linking structure having a carboxylic group are esterified, wherein the content of the cellulose component in the composite resin is from 9.1 to 41% by mass, and
wherein the tensile strength of the molded article of a cellulose-reinforced resin measured in conformity with JIS K7161 is 40 MPa or more.
(15) A method of producing a molded article composed of a cellulose-reinforced resin, containing employing the cellulose-reinforced thermoplastic resin composition described in any one of the above items (9) to (12), or a cellulose-reinforced thermoplastic resin composition produced by the method of producing a cellulose-reinforced thermoplastic resin composition described in the above item (13), and subjecting it to molding.
(16) A molded article of a cellulose-reinforced resin, which is obtained by molding the thermoplastic resin composition described in any one of the above items (1) to (8).

Effects of Invention

According to the present invention, it is possible to provide: a thermoplastic resin composition which is capable of conveniently and uniformly dispersing cellulose in a resin having a high hydrophobic property and also is capable of improving a mechanical strength of a molded material that has been formed by molding the obtained resin composition; a cellulose-reinforced thermoplastic resin composition; and a molded article of a cellulose-reinforced resin.

Further, according to the present invention, it is possible to provide a method of producing such a cellulose-reinforced thermoplastic resin composition described above, and a method of producing a molded article of a cellulose-reinforced resin in simplicity and at a low cost.

A wide use of the cellulose-reinforced resin composition or the molded article thereof according to the present invention allows expectations of reduction in weight, high-strength reinforcement, thinning, decrease in incineration ash at the disposal, and the like.

DESCRIPTION OF EMBODIMENTS

The thermoplastic resin composition of the present invention contains a thermoplastic synthetic resin, a cellulose, and an organic peroxide.

The content of the cellulose is from 10 to 70 parts by mass with respect to 100 parts by mass of the above-described thermoplastic synthetic resin.

Further, the tensile strength of a resin composed of the thermoplastic resin composition measured in conformity with JIS K7161 is 40 MPa or more.

The cellulose-reinforced thermoplastic resin composition and the molded article of a cellulose-reinforced thermoplastic resin according to the present invention are obtained by subjecting the above-described thermoplastic resin composition to a heat kneading thereby reacting components contained therein.

Therefore, the cellulose-reinforced thermoplastic resin composition and the molded article of the cellulose-reinforced thermoplastic resin each have a cross-linking structure between the thermoplastic synthetic resin and the cellulose derived from a cellulose fiber, and further each contain an ester-linked composite resin in which a hydroxyl group of the cellulose and a polyolefin resin provided with a cross-linking structure having a carboxylic group are esterified, in which the content of the cellulose component in the composite resin is from 9.1 to 41% by mass. The tensile strength of a resin composed of the above-described cellulose-reinforced thermoplastic resin composition and the molded article of the cellulose-reinforced thermoplastic resin measured in conformity with JIS K7161 is 40 MPa or more.

<<Tensile Strength>>

In the present invention, the tensile strength of the thermoplastic resin composition is characteristic features or a physical property of the thermoplastic resin composition, and is evaluated using a specimen obtained by processing a cellulose-reinforced thermoplastic resin composition which is obtained by subjecting the thermoplastic resin composition to a heat kneading, thereby reacting components contained therein, so that a form of the specimen meets the tensile strength evaluation in conformity with the Specimen Type No. 2 of JIS K7127.

On the other hand, in the cellulose-reinforced thermoplastic resin composition, the components contained therein are already reacted, and therefore the cellulose-reinforced thermoplastic resin composition is only processed in the form of a specimen which meets the tensile strength evaluation in conformity with the Specimen Type No. 2 of JIS K7127.

In order to bring about reactions of the components contained in the thermoplastic resin composition by using an organic peroxide as a radical polymerization initiator, it is generally enough to be a temperature or more at which a radical reaction is initiated by a thermal decomposition of the organic peroxide, specifically 1-minute half-life temperature of the organic peroxide or more (preferably a temperature by 20° C. higher than the 1-minute half-life temperature). The cellulose-reinforced thermoplastic resin composition can be prepared as a pellet by a heat kneading using a commonly used twin screw extruder.

Hereinafter, conditions of the heat kneading are described. However, these do not prescribe the production method of the present invention, but are conditions for measuring a tensile strength which is a parameter as a physical property or characteristic feature.

The kneading temperature of the thermoplastic resin composition is at least a temperature at which the organic peroxide present in the composition decomposes, and preferably a temperature by 20° C. higher than the 1-minute half-life temperature of the organic peroxide to be used. Meanwhile, the agitation is not particularly limited. For example, it is enough to perform the agitation at the rotating speed of 100 rpm with a screw diameter of 15 mm and L/D=45.

In this heat kneading, the use of even a model heat kneader instead of a heat kneader used in the production does not matter.

In a case of the heat kneading by a twin screw extruder [for example, KZW15TW-45MG-NH, manufactured by Technovel Corporation], the heat kneading is performed by casting each of components in a hopper of the twin screw extruder with a screw diameter of 15 mm and L/D=45 through a feeder controlled by a gravimetric feed system per hour, and by setting a barrel temperature in a kneading zone to a temperature by 20° C. higher than the 1-minute half-life temperature of the organic peroxide, and at a screw rotation speed of 100 rpm.

Measurement of the tensile strength is performed in conformity with JIS K7161 using a tensile specimen prepared in conformity with the Specimen Type No. 2 of JIS K7127 from a cellulose-reinforced thermoplastic resin composition which is obtained by subjecting the thermoplastic resin composition to a heat kneading, thereby reacting components contained therein.

Meanwhile, in a case of the heat kneading using a twin screw extruder, the above-described specimen is prepared by subjecting pellets of the thermoplastic resin composition obtained by the heat kneading using the twin screw extruder to drying at 80° C. for 24 hours, and by molding the pellets using an injection molding machine [for example, ROBOSHOT α-30C, manufactured by Fanuc Corporation].

The tensile strength is measured using a tensile tester [for example, INSTRON tester Model 5567, manufactured by Instron Co., Ltd.] under the conditions of gauge length: 25 mm and test speed: 50 mm/min.

The higher tensile strength in the above is more preferable. In the present invention, the tensile strength is 40 MPa or more, more preferably 45 MPa or more, further preferably 50 MPa or more, and particularly preferably 55 MPa or more.

Meanwhile, the upper limit of the tensile strength is 100 MPa in practice.

The tensile strength can be controlled by the type and content of the components contained in each of the above-described resin composition, cellulose-reinforced thermoplastic resin composition, molded article of the cellulose-reinforced thermoplastic resin. In particular, it is effective for control of the tensile strength to adjust the blended amount of the organic peroxide and it is more effective to adjust by using the blended amount of both organic peroxide and a maleic anhydride-modified polyolefin in combination with balance.

Hereinafter, in order from the thermoplastic resin composition, an explanation is given.

<<Thermoplastic Resin Composition>>

The thermoplastic resin composition of the present invention contains at least, a thermoplastic synthetic resin, a cellulose and an organic peroxide. The thermoplastic synthetic resin may contain an unsaturated carboxylic acid- or its anhydride-graft modified polyolefin resin.

At first, in order from the thermoplastic synthetic resin, an explanation is given.

<Thermoplastic Synthetic Resin>

In the present invention, the base resin is a thermoplastic synthetic resin, one type of which may be an unsaturated carboxylic acid- or its anhydride-graft modified polyolefin resin.

[Base Resin]

The base resin means a largest content of resin component of the thermoplastic synthetic resin contained in the thermoplastic resin composition, and the base resin may be contained in the thermoplastic synthetic resin in a mass amount which is equal to or more than the unsaturated carboxylic acid- or its anhydride-graft modified polyolefin resin. Meanwhile, hereinafter, in convenience for explanation, the base resin and the unsaturated carboxylic acid- or its anhydride-graft modified polyolefin resin are separately explained.

However, because the cellulose is not a synthetic resin, cellulose is not included in the thermoplastic synthetic resin.

The thermoplastic synthetic resin of the base resin used in the present invention is not particularly limited, and any type of the synthetic resin does not matter, as long as it is commonly used as a thermoplastic synthetic resin. Therefore, even the unsaturated carboxylic acid- or its anhydride-graft modified polyolefin resin described below does not matter.

Examples of the thermoplastic synthetic resin as the base resin include a polyolefin resin, a polyester resin, a polycarbonate resin, a polyamide resin, a polyimide resin, a polyurethane resin, a polyphenylenesulfide resin, a polyphenylene oxide resin, a cellulose acylate resin, a phenol resin, a melamine resin, an epoxy resin, a phenoxy resin, and a silicon resin.

Among these, the polyolefin resin is preferable in the present invention.

The polyolefin resin used in the present invention is a polyolefin resin prepared by polymerizing at least one kind of olefin, and the polyolefin resin may be a homopolymer or a copolymer.

The specific examples of such olefin include α-olefin having 4 to 12 carbon atoms including ethylene, propylene, isobutylene, and isobutene (1-butene), butadiene, isoprene, (meth)acrylic acid ester, (meth)acrylic acid, (meth)acrylamide, vinyl alcohol, vinyl acetate, vinyl chloride, styrene, and acrylonitrile.

In addition, specific examples of the α-olefin having 4 to 12 carbon atoms include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-dodecene.

Specific examples of the polyolefin resin include a polyethylene resin, a polypropylene resin, a polyisobutylene resin, a polyisobutene resin, a polyisoprene resin, a polybutadiene resin, a (meth)acrylic resin (that is, an allyl resin), a vinyl resin such as a poly(vinyl chloride) resin, a poly (meth)acrylamide resin, a polystyrene resin, an acrylonitrile-butadiene-styrene copolymer resin (ABS resin), an ethylene-(meth)acrylate copolymer and an ethylene-vinyl acetate copolymer.

Among these resins, a polyethylene resin, a polypropylene resin, and an acrylonitrile-butadiene-styrene copolymer resin (ABS resin) are preferable, and a polyethylene resin and a polypropylene resin are more preferable.

Examples of the polyethylene resin include an ethylene homopolymer, an ethylene-α-olefin copolymer, and the like. As the α-olefin, 1-butene, 1-pentene, 1-hexene, and 1-octene are preferable.

Specific examples of the ethylene-α-olefin copolymer include an ethylene-1-butene copolymer, an ethylene-1-pentene copolymer, an ethylene-1-hexene copolymer, an ethylene-1-octene copolymer, and the like.

In addition, in a case where classification is made depending on density or shape, any of a high density polyethylene (HDPE), a low density polyethylene (LDPE), a very low density polyethylene (VLDPE), a linear low density polyethylene (LLDPE) and an ultra-high molecular weight polyethylene (UHMW-PE) may be used.

Specific examples of the vinyl resin include a vinyl chloride resin [a homopolymer of a vinyl chloride monomer (poly(vinyl chloride) resin and the like), a copolymer of a vinyl chloride monomer with other monomer (a vinyl chloride-vinyl acetate copolymer, a vinyl chloride-(meth)acrylic acid ester copolymer) and the like], a vinyl alcohol resin (a homopolymer such as poly(vinyl alcohol), a copolymer such as an ethylene-vinyl alcohol copolymer and the like), and a poly(vinyl acetal) resin such as poly(vinyl formal). These vinyl resins can be used singly or two or more kinds thereof can be used in combination.

As a thermoplastic resin which constitutes the cellulose-reinforced thermoplastic resin composition of the present invention, a cross-linkable polyolefin resin is preferable. Examples thereof include a low density polyethylene, a medium density polyethylene, a high density polyethylene, a linear low density polyethylene, a linear very low density polyethylene, an ethylene-propylene block copolymer, an ethylene-propylene random copolymer, an ethylene-butene block copolymer, an ethylene-butene random copolymer, an ethylene-vinyl acetate copolymer, an ethylene-methyl methacrylate copolymer, an ethylene-methyl acrylate copolymer resin, an ethylene-ethyl acrylate copolymer resin, and an ethylene-butyl acrylate copolymer resin.

The polyolefin resin of the base resin may be used alone, or may be used in combination of two or more kinds. Meanwhile, in a case of using a plurality of polyolefin resins, a blended amount of the other component is defined with respect to 100 parts by mass of a total amount of the polyolefin resin, unless otherwise indicated.

Melt flow rate (MFR) of the polyolefin resin is usually 0.01 to 400 g/10 minutes, and from the standpoint of enhancing mechanical strength and production stability, 1 to 400 g/10 minutes is preferable, 0.1 to 50 g/10 minutes is more preferable, and 0.4 to 10 g/10 minutes is further preferable.

Meanwhile, in the present invention, the melt flow rate is defined as a mass of the polymer including the unsaturated carboxylic acid- or its anhydride-graft modified polyolefin resin, which outflows per 10 min (g/10 min) at 190° C. under the load of 2.16 kg in conformity with JIS K7210.

[Unsaturated Carboxylic Acid- or its Anhydride-Graft Modified Polyolefin Resin]

As the thermoplastic synthetic resin, for example, representative polyethylene, polypropylene and polystyrene are consisting of a carbon atom and a hydrogen atom, and therefore exhibit an extremely high hydrophobic property.

On the other hand, the surface of the cellulose fiber has a high polarity due to a hydroxyl group located at the surface, and has a poor compatibility with the thermoplastic resin which exhibits a high hydrophobic property and therefore it is difficult to disperse a cellulose fiber uniformly in the thermoplastic resin.

In the present invention, in order to uniformly disperse a cellulose fiber that has a hydroxyl group of the polar group and exhibits a high hydrophilic property in the thermoplastic resin that exhibits a high hydrophobic property, an unsaturated carboxylic acid- or its anhydride-graft modified polyolefin resin is used.

The carboxyl group ($-CO_2H$) and the $-C(=O)-O-C(=O)-$ bond derived from the acid anhydride existing in the unsaturated carboxylic acid- or its anhydride-graft modified polyolefin resin exhibit a high affinity or compatibility to the surface of the cellulose fiber due to a hydrogen bond with the hydroxyl group ($-OH$) located at the surface of the cellulose fiber or due to an interaction such as a dipolar interaction.

On the other hand, the polyolefin moiety of the unsaturated carboxylic acid- or its anhydride-graft modified polyolefin resin exhibits a high hydrophobic property in common with the thermoplastic synthetic resin and their structures are also mutually similar, and therefore both the compatibility and the affinity to each other are high.

Therefore, the unsaturated carboxylic acid- or its anhydride-graft modified polyolefin resin promotes a uniform dispersion of the cellulose fiber into a thermoplastic synthetic resin.

Because the unsaturated carboxylic acid- or its anhydride-graft modified polyolefin resin has both a partial structure of interacting with a hydrophobic thermoplastic resin and a partial structure of interacting with a hydrophilic cellulose fiber in molecule as described above and acts as an intermediary tying the hydrophobic thermoplastic resin and the hydrophilic cellulose fiber, the unsaturated carboxylic acid- or its anhydride-graft modified polyolefin resin is categorized as a coupling agent.

Further, because the unsaturated carboxylic acid or its anhydride structural portion of the unsaturated carboxylic acid- or its anhydride-graft modified polyolefin resin exists extremely close to a hydroxyl group at the surface of the cellulose fiber as described above, an esterification reaction with the hydroxyl group of the cellulose is easily and efficiently caused, whereby the cellulose and the unsaturated carboxylic acid- or its anhydride-graft modified polyolefin resin are chemically bound to each other to form a composite resin.

In the present invention, a crosslinking reaction between the base resin and the cellulose derived from the cellulose fiber progresses due to radicals derived from decomposition of the organic peroxide, whereby a rigid composite resin is formed. Further, the organic peroxide causes the formation of the crosslinking structure due to a radical reaction of the unsaturated carboxylic acid- or its anhydride-graft modified polyolefin resin and the base resin. As a result, all of the cellulose, the unsaturated carboxylic acid- or its anhydride-graft modified polyolefin resin, and the base resin are chemically bound (covalently bound) to each other, thereby forming a more rigid composite resin.

The unsaturated carboxylic acid or its anhydride engaging in graft modification of the unsaturated carboxylic acid- or its anhydride-graft modified polyolefin resin does not matter either a linear compound or a cyclic compound. In the present invention, a cyclic compound is preferable and a cyclic unsaturated carboxylic anhydride is more preferable.

The amount of graft modification caused by the unsaturated carboxylic acid or its anhydride is preferably from 0.1 to 25 parts by mass, more preferably from 0.1 to 10 parts by mass, and further preferably from 0.1 to 4 parts by mass, of the unsaturated carboxylic acid or its anhydride with respect to 100 parts by mass of the unmodified polyolefin resin.

Examples of the unsaturation carboxylic acid include maleic acid, fumaric acid, itaconic acid, acrylic acid, and methacrylic acid.

Among the unsaturated carboxylic anhydride, examples of the cyclic acid anhydride include acid anhydrides of maleic acid skeleton, such as maleic anhydride, citraconic anhydride (methyl maleic anhydride), 2,3-dimethyl maleic anhydride, 2-(2-carboxyethyl)3-methyl maleic anhydride, 2-cyclohexene-1,2-dicarboxylic anhydride, phenyl maleic anhydride, 2,3-diphenyl maleic anhydride, 5,6-dihydro-1,4-dithiin-2,3-dicarboxylic anhydride, 2,3-bis(2,4,5-trimethyl-3-thienyl)maleic anhydride; and acid anhydrides of phthalic acid skeleton, such as 4-ethynyl phthalic anhydride, 4,4'-(ethyne-1,2-diyl)diphthalic anhydride, 4-(1-propynyl) phthalic anhydride, and 4-phenylethynyl phthalic anhydride.

Of the unsaturated carboxylic anhydrides, examples of the linear acid anhydrides include acid anhydrides of each of fumaric acid, itaconic acid, acrylic acid, and methacrylic acid, and mixed acid anhydrides of these unsaturated carboxylic acids and a saturated aliphatic acid, an aromatic carboxylic acid, or a heterocyclic carboxylic acid.

In the present invention, a cyclic unsaturated carboxylic anhydride is preferable, an acid anhydride of a maleic acid-skeleton is more preferable, and a maleic anhydride is particularly preferable.

The polyolefin of the maleic anhydride-modified polyolefin is not particularly limited, as long as its compatibility to the base resin is good. As the maleic anhydride-modified polyolefin, a maleic anhydride-modified polyethylene, a maleic anhydride-modified polypropylene, and a maleic anhydride-modified polystyrene are preferable, and a maleic anhydride-modified polyethylene and a maleic anhydride-modified polypropylene are more preferable.

Meanwhile, a maleic anhydride-modified copolymer derived from the copolymer composed of two kinds of monomers selected from ethylene, propylene and styrene is also preferable.

Examples of the maleic anhydride-modified polyethylene and the maleic anhydride-modified polypropylene include a maleic anhydride-modified ethylene-propylene copolymer, a maleic anhydride-modified ethylene-α-olefin copolymer (ethylene-vinyl acetate copolymer, ethylene-hexene copolymer, ethylene-octene copolymer, and the like), and styrene/ethylene/butylene/styrene (SEBS) having a group including a maleic anhydride. Further, as a polar group to be grafted or copolymerized, not only a maleic anhydride, but also a polar group [alkylene glycol-based or (meth)acrylic acid-based monomer component] may be contained.

Of these materials, particularly preferred are a maleic anhydride-modified polyolefin (polyethylene, polypropylene, polystyrene, or copolymers thereof), a maleic anhydride-modified ethylene-propylene copolymer, a maleic anhydride-modified ethylene-α-olefin copolymer (ethylene-vinyl acetate copolymer, ethylene-hexene copolymer, ethylene-octene copolymer, and the like), and styrene/ethylene/butylene/styrene (SEBS) having a group including a maleic anhydride.

As the maleic anhydride-modified polyolefin resin, a maleic anhydride-modified polyethylene is most preferable.

In particular, a maleic anhydride-modified polyethylene having a melt flow rate (MFR) of 0.3 to 10 g/10 min under the conditions of 190° C. and load of 2.16 kg is preferable. Further, a maleic anhydride-modified polyethylene having an infrared spectrum relative intensity ratio of 0.1 to 0.2 obtained by measuring an infrared spectrum is preferable.

The infrared spectrum relative intensity ratio can be measured using a 100 μm-thick film prepared by subjecting a maleic anhydride-modified polyethylene to a hot press at 150° C. for 5 min. at the pressure of 200 kgf/cm$^2$.

A relative intensity ratio of the maleic anhydride-modified polyethylene is calculated from a ratio of absorption intensity in the vicinity of 1791 cm$^{-1}$ (absorption peak of carbonyl (C=O) stretching vibration of the saturated 5-membered ring acid anhydride derived from the maleic anhydride)/absorption intensity in the vicinity of 719 cm$^{-1}$ (absorption peak of rocking vibration of a methylene group derived from polyethylene).

The infrared spectrum relative intensity ratio of 0.1 to 0.2 allows a solid adhesion of the interface between the thermoplastic resin composition and the cellulose.

The infrared spectrum relative intensity ratio is preferably 0.15 to 0.2.

In the present invention, it is preferable that a polyolefin resin prior to modification of the unsaturated carboxylic acid- or its anhydride-graft polyolefin resin, and a polyolefin resin of the polyolefin base resin which is not modified with an unsaturated carboxylic acid or its anhydride are different polyolefin resin from each other.

Herein, the term "different" includes a difference in the type of resin component or the constituting monomer component, and a difference in physical properties such as MFR.

The content of the unsaturated carboxylic acid- or its anhydride-modified polyolefin resin is preferably from 0.5 to 20 parts by mass, more preferably from 1 to 15 parts by mass, and further preferably from 1 to 10 parts by mass, with respect to 100 parts by mass of the base resin.

In a case of containing too little of the unsaturated carboxylic acid- or its anhydride-modified polyolefin resin, an effect on the interface adhesion between the cellulose and the resin is not sufficiently obtained, so that an effect of enhancing a mechanical strength is not sufficiently obtained. In a case of containing too much of the unsaturated carboxylic acid- or its anhydride-modified polyolefin resin, it adversely affects a strength of the base resin, so that a strength of the entire resin composition is weaken.

<Organic Peroxide>

The organic peroxide is a polymerization initiator by which thermoplastic synthetic resins such as the base resin and the unsaturated carboxylic acid- or its anhydride-modified polyolefin resin are inter-molecularly cross-linked due to a radical reaction.

The organic peroxide is a compound having at least a carbon atom and a —O—O— bond. Examples thereof include a ketoneperoxide, a peroxyketal, a hydroperoxide, a dialkyl peroxide, an acylperoxide, an alkylperester, a diacylperoxide, a monoperoxycarbonate, and a peroxydicarbonate.

In the present invention, among these, a peroxyketal, a dialkyl peroxide, a diacylperoxide, an alkylperoxy ester and a monoperoxycarbonate are preferable; and a dialkyl peroxide is particularly preferable.

The organic peroxide is preferably an organic peroxide represented by any of Formulas (1) to (9).

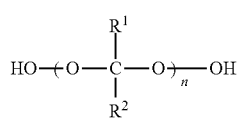

Formula (1)

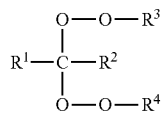

Formula (2)

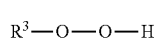

Formula (3)

$$R^3-O-O-H$$

Formula (4)

$$R^3-O-O-R^4$$

Formula (5)

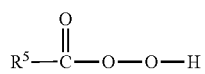

Formula (6)

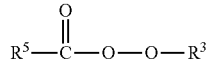

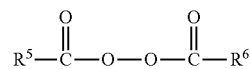

Formula (7)

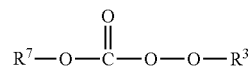

Formula (8)

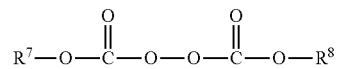

Formula (9)

In Formulas, $R^1$ to $R^8$ each independently designate an alkyl group, a cycloalkyl group or an aryl group. Herein, $R^1$ and $R^2$ may be bonded to each other to form a ring, and $R^3$ and $R^4$ may be bonded to each other to form a ring. n is an integer of 1 to 6.

The alkyl group may be linear or branched. The number of carbon atoms of the alkyl group is preferably 1 to 20, and more preferably 1 to 12.

The number of rings of the cycloalkyl group is preferably 3 to 7, and more preferably 5 or 6. The number of carbon atoms of the cycloalkyl group is preferably 3 to 20, and more preferably 3 to 12. Examples thereof include cyclopropyl, cyclopentyl, and cyclohexyl.

The alkyl group and the cycloalkyl group may have a substituent, and examples of such a substituent include an alkyl group, an alkenyl group, an alkynyl group, a cycloalkyl group, an aryl group, an alkoxy group, an aryloxy group, an acyl group, an acyloxy group, an alkoxycarbonyl group, an aryloxycarbonyl group, a halogen atom, and a carboxy group.

The number of carbon atoms of the aryl group is preferably 6 to 20, and more preferably 6 to 12. The aryl group may have a substituent, and examples of such a substituent include an alkyl group, a cycloalkyl group, an aryl group, an alkoxy group, an aryloxy group, and a halogen atom. Examples of the aryl group include phenyl and naphthyl, and phenyl is preferable.

As a ring which is formed by a mutual combination of $R^1$ and $R^2$, a 5- or 6-membered saturated carbon ring is preferable, and a cyclopentane ring and a cyclohexane ring are preferable.

As a ring which is formed by a mutual combination of $R^3$ and $R^4$, a 7- to 12-membered ring is preferable, and the —O—O— group may be contained in the bond which constitutes the ring.

As the organic peroxide represented by Formula (2), a dimer like the Formula (2a) which is formed when $R^1$ and $R^2$ bond to each other to form a ring, is also preferable.

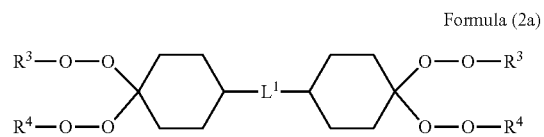

Formula (2a)

In Formula (2a), $R^3$ and $R^4$ have the same meanings as $R^3$ and $R^4$ in Formula (2), and preferable ranges are also the same. $L^2$ designates a divalent linking group; and preferably —O—, —S—, —SO$_2$—, —C(=O)—, an alkylene group or an arylene group.

As the organic peroxide represented by Formula (4), a dimer like the Formula (4a) which is formed when R⁴ is an alkyl group having a substituent is also preferable.

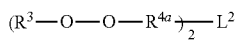
Formula (4a)

In Formula (4a), $R^3$ has the same meanings as $R^3$ in Formula (4), and a preferable range is also the same. $R^{4a}$ designates an alkyl group, a cycloalkyl group or an aryl group. $L^2$ designates a divalent linking group; and preferably —O—, —S—, —SO₂—, —C(=O)—, an alkylene group, an ethenylene group, an ethynylene group or an arylene group.

Of the organic peroxides represented by any one of Formulae (1) to (9), the organic peroxides represented by any one of Formulae (2), (4), and (6) to (8) are preferable. In particular, the organic peroxide represented by Formula (4) is preferable.

Examples of the organic peroxide include the following specific compounds.

(1) Ketoneperoxide Compound

Examples thereof include cyclohexanone peroxide, and linear chain methyl ethyl ketone peroxide.

(2) Peroxyketal Compound

Examples thereof include 1,1-bis(t-butylperoxy)-3,3,5-trimethylcyclohexane, 1,1-bis(t-butylperoxy)cyclohexane, 2,2-bis(t-butylperoxy)octane, n-butyl-4,4-bis(t-butylperoxy) valerate, 2,2-bis(t-butylperoxy)butane, and cyclic methyl ethyl ketone peroxide.

(3) Hydroperoxide Compound

Examples thereof include t-butyl peroxide, and t-butyl cumyl peroxide.

(4) Dialkyl Peroxide Compound

Examples thereof include di-t-butyl peroxide, t-butyl cumyl peroxide, dicumyl peroxide, α,α'-bis(t-butylperoxy-m-isopropyl)benzene, 2,5-dimethyl-2,5-di(t-butylperoxy) hexane, and 2,5-dimethyl-2,5-di(t-butylperoxy)hexyne-3.

(5) Acylperoxide Compound

Examples thereof include acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide, and m-toluoyl peroxide.

(6) Alkylperester Compound

Examples thereof include t-butylperoxy acetate, t-butylperoxy isobutyrate, t-butylperoxy pivalate, t-butylperoxy neodecanoate, cumylperoxy neodecanoate, t-butylperoxy-2-ethylhexanoate, t-butylperoxy-3,5,5-trimethyl hexanoate, t-butylperoxy laurate, t-butylperoxy benzoate, di-t-butylperoxy isophthalate, 2,5-dimethyl-2,5-di(benzoylperoxy) hexane, t-butylperoxy maleic acid, t-butylperoxy isopropylcarbonate, cumylperoxy octoate, t-hexylperoxy neodecanoate, t-hexylperoxy pivalate, t-butylperoxy neohexanoate, t-hexylperoxy neohexanoate, and cumylperoxy neohexanoate.

(7) Diacylperoxide Compound

Examples thereof include diacetyl peroxide, diisobutyryl peroxide, di-octanoyl peroxide, didecanoyl peroxide, dilauroyl peroxide, bis(3,5,5-trimethylhexanoyl)peroxide, dibenzoyl peroxide, bis(2,4-dichlorobenzoyl)peroxide, and bis(m-toluoyl)peroxide.

(8) Monoperoxycarbonate Compound

Examples thereof include t-butylperoxy isopropylcarbonate, and t-amylperoxy-2-ethylhexyl carbonate.

(9) Peroxydicarbonate Compound

Examples thereof include di-n-propylperoxy dicarbonate, diisopropylperoxy dicarbonate, di-s-butylperoxy dicarbonate, bis(4-t-butylcyclohexyl dicarbonate, and bis(2-ethylhexylperoxydicarbonate.

In the present invention, the 1-minute half-life temperature of the organic peroxide is preferably from 130 to 190° C.

Herein, the half-life of the organic peroxide means a period of time until the amount of its active oxygen due to a heat decomposition of the organic peroxide is reduced by half of the amount before the decomposition.

If the 1-minute half-life temperature of the organic peroxide is too high, a temperature setting of the twin screw extruder becomes difficult. In reverse, if it is too low, the organic peroxide itself becomes unstable, which results in decomposition during storage.

The setting of the 1-minute half-life temperature of the organic peroxide to the above-described range allows a heat kneading to be practiced commonly by a twin screw extruder, whereby the cellulose can be uniformly dispersed in the resin exhibiting a high hydrophobic property.

The 1-minute half-life temperature of the organic peroxide is evaluated by preparing a 0.1 mole/L concentration of the organic peroxide solution using a relatively inactive solvent such as benzene and the like, and then measuring a temporal alteration in concentration of the organic peroxide when subjected to a heat decomposition (see "Kakyo-zai Handbook (Crosslinking Agent Handbook) (first edition)" published by Taiseisha Co., Ltd., p. 162).

The content of the organic peroxide is preferably from 0.01 to 0.30 parts by mass, more preferably from 0.05 to 0.20 parts by mass, and further preferably from 0.05 to 0.10 parts by mass with respect to 100 parts by mass of the base resin.

In a case of containing too little of the organic peroxide, a mechanical strength-enhancing effect of the resin composition is not fully obtained, whereas in a case of too much content, a heat fluidity of the resin composition is lowered, which results in difficulty of molding process.

The RO.(radical) derived from decomposition of the organic peroxide is formed by pulling hydrogens out respectively from the base resin and the cellulose. It is presumed that the radicals formed from the base resin and the radicals formed from the cellulose are combined to react with each other, whereby the base resin and the cellulose are interfacially adhered to each other.

Taking polyethylene as an example of the base resin, the above-described interfacial adhesion reaction is caused as follows.

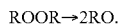

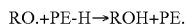

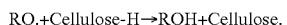

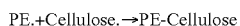

Herein, PE-H stands for polyethylene and Cellulose-H stands for cellulose. PE. and Cellulose.each stand for the formed radical.

<Cellulose>

The cellulose used in the present invention is fibrous cellulose, preferably plant fiber-derived cellulose, and particularly preferably fine plant fibrous cellulose (powdered pulp).

The pulp is also a raw material for paper and consists primarily of a tracheid which is extracted from a plant. From a chemical viewpoint, a primary constituent of the pulp is a polysaccharide and its primary constituent is cellulose.

The plant fiber-derived cellulose is not particularly limited, and specific examples thereof include a material derived from plant, such as wood, bamboo, hemp, jute, kenaf, agricultural product remains or wastes (for example, straw of wheat or rice plant, corn, stalks of cotton, and sugar cane), cloth, regenerated pulp, and waste paper. In the present invention, a wood or a material derived from the wood is preferable, and a kraft pulp is particularly preferable.

Meanwhile, the kraft pulp is a collective term of the pulp in which lignin-hemicellulose has been removed from a wood or a plant raw material by a chemical processing with caustic soda or the like, whereby almost pure cellulose has been extracted.

The cellulose used in the present invention has a diameter of preferably 1 to 30 μm, more preferably 1 to 20 μm, and further preferably 5 to 15 μm. The length (fiber length) of the cellulose is preferably 10 to 100 μm, and more preferably 20 to 50 μm.

In the present invention, the content of the cellulose is preferably 5 to 70 parts by mass, more preferably 10 to 60 parts by mass, and further preferably 10 to 30 parts by mass, with respect to 100 parts by mass of the thermoplastic synthetic resin containing the unsaturated carboxylic acid- or its anhydride-graft modified polyolefin resin.

If the blended amount of the cellulose is less than 5 parts by mass, full resin reinforcement effectiveness is not obtained. In reverse, if the blended amount exceeds 70 parts by mass, the heat fluidity of the resin composition lowers to reduce thereby molding processability, and in some cases, a mechanical strength is also sometimes reduced.

<Other Additives>

In the thermoplastic resin composition of the present invention, it is possible to add thereto a variety of additives such as inorganic fillers, for example talc, calcium carbonate, mica, glass fibers and the like or organic fillers, for example polyester, polyamide fibers and the like, and in addition to these, a flame retardant, a stabilizer, an antioxidant, an infrared absorber, a plasticizer, a lubricant and the like, and a colorant such as a dye and a pigment.

In the present invention, the components which constitute the thermoplastic resin composition may be blended in a commonly used amount, except for specifying the blended amount in such a way that from 10 to 70 parts by mass of the cellulose is contained with respect to 100 parts by mass of the thermoplastic synthetic resin or the thermoplastic synthetic resin containing an unsaturated carboxylic acid- or its anhydride-graft modified polyolefin resin. It is most preferable that all of the components are blended in each preferable range of the amount.

However, to blend particular components in a preferable range of the amount and other components in a commonly used range of the amount is also as always a preferable embodiment.

<<Cellulose-Reinforced Thermoplastic Resin Composition and Method of Producing the Same>>

The cellulose-reinforced thermoplastic resin composition of the present invention is produced from the above-described thermoplastic resin composition.

The cellulose-reinforced thermoplastic resin composition of the present invention is a product obtained by subjecting the above-described thermoplastic resin composition to a heat kneading, thereby reacting components contained therein.

In the above-described reaction, the thermoplastic resin and a hydrogen atom of the cellulose derived from the cellulose fiber are reacted by the organic peroxide as a radical reaction initiator, whereby a crosslinking reaction proceeds between the thermoplastic resin composition and the cellulose fiber. Further, the unsaturated carboxylic acid- or its anhydride-graft modified polyolefin resin and the cellulose react to each other, whereby an ester link of a hydrogen atom of the cellulose and the modified polyolefin resin provided with the cross-linking structure having a carboxyl group is formed.

Accordingly, the cellulose-reinforced thermoplastic resin composition of the present invention has a cross-linking structure between the thermoplastic synthetic resin and the cellulose derived from the cellulose fiber, and further contains an ester-linked composite resin in which a hydroxyl group of the cellulose and a polyolefin resin provided with a cross-linking structure having a carboxylic group are esterified. Herein, the content of the cellulose component in the composite resin is from 9.1 to 41% by mass, and the tensile strength of a resin composed of the cellulose-reinforced thermoplastic resin composition measured in conformity with JIS K7161 is 40 MPa or more.

In addition to the above, the cross-linking reaction caused by the organic peroxide as a radical reaction initiator also forms a crosslinking structure in which carbon atoms in the main chain of the unsaturated carboxylic acid- or its anhydride-graft modified polyolefin resin and carbon atoms in the main chain of a polyolefin resin which is not modified with an unsaturated carboxylic acid or its anhydride are bound at 2 or more sites.

In the present invention, as described above, the cellulose-reinforced thermoplastic resin composition is produced by subjecting the thermoplastic resin composition to a heat kneading.

The apparatus used for the heat kneading is not particularly limited, as long as it allows the heat kneading at the same temperature as pyrolysis temperature of the organic peroxide. Examples thereof include a blender, a kneader, a mixing roll, a Bunbury mixer, a single or twin screw extruder, and the like.

Of these apparatuses, a twin screw extruder is preferable.

In the twin screw extruder, the cellulose-reinforced thermoplastic resin composition can be obtained by casting each component directly into a hopper of the twin screw extruder using a gravimetric feeder, and then kneading the mixture using the twin screw extruder by setting a preset temperature of the kneading zone to the above-described temperature, thereby reacting the resultant kneaded material on heating.

In the cellulose-reinforced thermoplastic resin composition, the thermoplastic resin composition which was separately prepared and produced may be used. However, in the present invention, for example, in the step of producing a cellulose-reinforced thermoplastic resin composition using an extruder [for example, twin screw extruder such as KZW15TW-45MG-NH, manufactured by Technovel Corporation], the cellulose-reinforced thermoplastic resin composition is preferably produced by casting respectively each of components into a hopper of this extruder through a feeder controlled by a gravimetric feed system per hour, and by subjecting the thus-obtained thermoplastic resin composition to a heat kneading.

In this method, an existing apparatus and equipment can be used without change of the equipment, and further a cellulose-reinforced thermoplastic resin composition can be produced at the same time as the preparation of the thermoplastic resin composition of the present invention.

As described above, each of components is casted into a hopper of the extruder and is subjected to a heat kneading, for example, by setting a barrel temperature of a kneading zone to the pyrolysis temperature of the organic peroxide.

The kneading temperature is set to a temperature higher than the 1-minute half-life temperature of the organic peroxide. In the present invention, as compared to the 1-minute half-life temperature, a temperature higher by 5° C. or more is preferable, a temperature higher by 10° C. or more is more preferable, a temperature higher by 15° C. or more is further preferable, and a temperature higher by 20° C. or more is most preferable.

In the present invention, in a case of using common organic peroxides, the kneading temperature is preferably from 150 to 200° C.

As for the heat kneading, it is just enough to perform the heat kneading, for example, at the rotating speed of 100 rpm with a screw diameter of 15 mm and L/D=45.

The kneading time is not particularly limited. However, it is enough to be a reaction time which is commonly adopted when ordinary organic peroxides are used.

In a case of a cellulose-reinforced thermoplastic resin composition produced by using an extruder, the cellulose-reinforced thermoplastic resin composition pressed into pellets can be used for producing any types of molded article of the cellulose-reinforced thermoplastic resin composition.

Meanwhile, in the cellulose-reinforced thermoplastic resin composition of the present invention, the organic peroxide is blended, and therefore a decomposition residue of the organic peroxide due to a reaction caused by a heat kneading sometimes remains. As a result, even if the decomposition residue is contained in the cellulose-reinforced thermoplastic resin composition, it does not matter.

<<Molded Article of Cellulose-Reinforced Resin and Method of Producing the Same>>

The cellulose-reinforced resin or the molded article of the cellulose-reinforced resin according to the present invention is molded using the cellulose-reinforced thermoplastic resin composition of the present invention.

The molded article of the cellulose-reinforced resin is produced in accordance with an ordinary method of such molded articles depending on an intended article, except for using the cellulose-reinforced thermoplastic resin composition of the present invention.

Since the molded article of the cellulose-reinforced resin of the present invention is molded using the cellulose-reinforced thermoplastic resin composition of the present invention, the molded article of the cellulose-reinforced resin contains a linked composite resin in which the cellulose and the thermoplastic synthetic resin are linked. Further, the content of the cellulose component in the composite resin is from 9.1 to 41% by mass, and the tensile strength of the molded article of the cellulose-reinforced resin measured in conformity with JIS K7161 is 40 MPa or more.

In the molded article of the cellulose-reinforced thermoplastic resin of the present invention, as described above, because an interfacial adhesion between the thermoplastic synthetic resin and the cellulose is improved, the molded articles obtained by a variety of moldings are excellent in a mechanical strength, for example, tensile strength.

Further, as described above, because an existing equipment and apparatus can be used without new construction or reconstruction of the production equipment and apparatus, the production costs become less expensive.

Specific examples of an application of the molded article to be formed by the cellulose-reinforced thermoplastic resin composition of the present invention include a material for a vehicle such as an automobile and a two-wheeled vehicle, a structural member of a robot arm, a robot part for amusement, a prosthesis member, a material for electrical appliances, an OA device housing, a building material member, drainage facilities, a toiletry material, various tanks, a container, a sheet, a toy and sport goods.

Specific examples of the material for the vehicle include an interior part such as a door trim, a pillar, an instrumental panel, a console, a rocker panel, an armrest, an inner panel of door, a spare tire cover and a door knob, an exterior part such as a bumper, a spoiler, a fender, a side step and an outer panel of door, other parts such as an air intake duct, a coolant reserve tank, a radiator reserve tank, a window-washer tank, a fender liner and a fan, and an integrally molded part such as a front-end panel.

EXAMPLES

Hereinafter, the present invention will be described more in detail with reference to Examples, but the present invention is not limited thereto.

Hereinafter, the used materials are shown.

<Used Materials>
(1) Thermoplastic synthetic resin
  Base resin: High density polyethylene (HDPE)
    MFR (190° C./2.16 kg)=5 g/10 minutes
    density=0.953 g/cm$^3$
(2) Cellulose
  Pulp [manufactured by NIPPON PAPER Chemicals CO., LTD., trade name KC FLOC W-200, powdered cellulose having average particle diameter of about 32 µm]
(3) Maleic anhydride-modified polyethylene
  Maleic anhydride-modified polyethylene A
    MFR (190° C./2.16 kg)=9.0 g/10 minutes
    Infrared spectrum relative intensity ratio=0.15
  Maleic anhydride-modified polyethylene B
    MFR (190° C./2.16 kg)=0.4 g/10 minutes
    Infrared spectrum relative intensity ratio=0.14
  Maleic anhydride-modified polyethylene C
    MFR (190° C./2.16 kg)=3.4 g/10 minutes
    Infrared spectrum relative intensity ratio=0.10
  Maleic anhydride-modified polyethylene D
    MFR (190° C./2.16 kg)=4.4 g/10 minutes
    Infrared spectrum relative intensity ratio=0.16
  Maleic anhydride-modified polyethylene E
    MFR (190° C./2.16 kg)=1.3 g/10 minutes
    Infrared spectrum relative intensity ratio=0.17
  Maleic anhydride-modified polyethylene F
    MFR (190° C./2.16 kg)=1.2 g/10 minutes
    Infrared spectrum relative intensity ratio=0.16
  Maleic anhydride-modified polyethylene G
    MFR (190° C./2.16 kg)=1.1 g/10 minutes
    Infrared spectrum relative intensity ratio=0.12
(4) Organic peroxide
  Peroxyketal [manufactured by NOF CORPORATION, trade name PERHEXA C]
  Dialkyl peroxide A [manufactured by NOF CORPORATION, trade name PERHEXA 25B]
  Dialkyl peroxide B [manufactured by NOF CORPORATION, trade name PERCUMYL D]
  Dialkyl peroxide C [manufactured by NOF CORPORATION, trade name PERBUTYL D]
  Diacylperoxide [manufactured by NOF CORPORATION, trade name NYPER FF]

Alkylperoxy ester [manufactured by NOF CORPORATION, trade name PERBUTYL A]
Monoperoxycarbonate [manufactured by NOF CORPORATION, trade name PERHEXYL I]

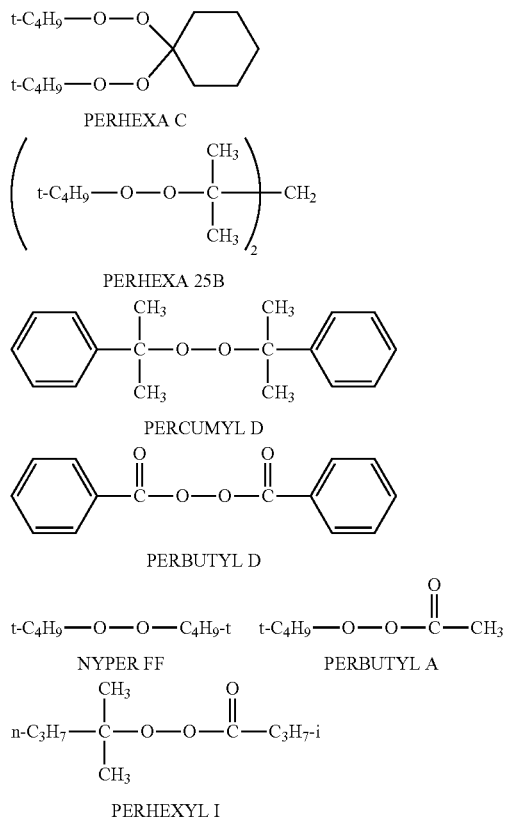

At the beginning, common production method, molding method, and evaluation method of physical properties, each of which is conducted in each of Examples and Comparative Examples, are described.

<Method of Producing Cellulose-Reinforced Thermoplastic Resin Composition>

The above-described thermoplastic synthetic resin (1), cellulose (2), maleic anhydride-modified polyolefin (3) and organic peroxide (4) were casted respectively into a hopper of the twin screw extruder [KZW15TW-45MG-NH, manufactured by Technovel Corporation] with a screw diameter of 15 mm and L/D=45 through a feeder controlled by a gravimetric feed system per hour. The cellulose-reinforced thermoplastic resin composition was obtained by subjecting the above components to a heat kneading under the conditions of the barrel temperature set to a temperature by 20° C. higher than the 1-minute half-life temperature of the organic peroxide, and a screw rotating speed of 100 rpm.

<Molding Method of Molded Article for Tensile Strength Evaluation>

The cellulose-reinforced thermoplastic resin composition thus obtained in the pellet form was dried at 80° C. for 24 hours and a tensile test specimen was prepared by molding the dried pellets using an injection molding machine [ROBOSHOT α-30C, manufactured by Fanuc Corporation] in conformity with the Specimen Type No. 2 of JIS K7127.

(Evaluation Method of Tensile Strength)

The tensile strength (MPa) of the tensile test specimen prepared above was measured using a tensile tester [INSTRON tester Model 5567, manufactured by Instron Co., Ltd.] under the conditions of gauge length: 25 mm and test speed: 50 mm/min.

<Physical Properties Measurement of Materials for Use>

The MFR of the base resin of the thermoplastic synthetic resin and the maleic anhydride-modified polyethylenes A to G, the infrared spectrum relative intensity ratio of the maleic anhydride-modified polyethylenes A to G, and the 1-minute half-life temperature of the organic peroxides to be used were measured as follows.

(Measurement Method of MFR)

The mass of a polymer flowing out per 10 min (g/10 min) under a load of 2.16 kg at 190° C. was measured using Melt Indexer (manufactured by Toyo Seiki Co., Ltd.) in conformity with JIS K7210.

(Measurement Method of Infrared Spectrum Relative Intensity Ratio)

Each maleic anhydride-modified polyethylene was subjected to a hot press at 150° C. for 5 min at the pressure of 200 kgf/cm$^2$, thereby preparing a 100 μm-thick film. The infrared spectrum of the prepared film was measured, and the relative intensity ratio was calculated from a ratio of absorption intensity in the vicinity of 1791 cm$^{-1}$/absorption intensity in the vicinity of 719 cm$^{-1}$.

(Measurement Method of 1-Minute Half-Life Temperature of Organic Peroxide)

The half-life which is a time until the amount of active oxygen generated by a heat decomposition of the organic peroxide reaches by half of the amount of active oxygen before the heat decomposition was evaluated by preparing a 0.1 mole/L concentration of benzene solution of organic peroxide and then measuring a temporal change in concentration of the organic peroxide when subjected to a heat decomposition.

Example 1

A thermoplastic resin composition composed of 11 parts by mass of cellulose, 1 part by mass of maleic anhydride-modified polyethylene A, and 0.1 parts by mass of dialkyl peroxide A with respect to 100 parts by mass of high-density polyethylene was subjected to a heat kneading by using a twin screw extruder [KZW15TW-45MG-NH, manufactured by Technovel Corporation] to obtain thereby a cellulose-reinforced thermoplastic resin in the pellet form.

Next, using the above-described pellet, a specimen as a molded article for measurement of the tensile strength was prepared by an injection molding machine [ROBOSHOT α-30C, manufactured by Fanuc Corporation].

Examples 2 to 5

Specimens as a molded article for measurement of the tensile strength were prepared in the same manner as in Example 1, except for changing the blended amount of maleic anhydride-modified polyethylene A in the thermoplastic resin composition of Example 1 as shown in Table 1.

Example 6

A specimen as a molded article for measurement of the tensile strength was prepared in the same manner as in Example 1, except for changing the thermoplastic resin composition of Example 1 to a thermoplastic resin composition composed of 11 parts by mass of cellulose, 2 parts by mass of maleic anhydride-modified polyethylene A, and 0.05 parts by mass of dialkyl peroxide A with respect to 100 parts by mass of the high-density polyethylene.

Example 7

A specimen as a molded article for measurement of the tensile strength was prepared in the same manner as in Example 1, except for changing the thermoplastic resin composition of Example 1 to a thermoplastic resin composition composed of 11 parts by mass of cellulose, 5 parts by mass of maleic anhydride-modified polyethylene A, and 0.05 parts by mass of dialkyl peroxide A with respect to 100 parts by mass of the high-density polyethylene.

Example 8

A specimen as a molded article for measurement of the tensile strength was prepared in the same manner as in Example 1, except for changing the thermoplastic resin composition of Example 1 to a thermoplastic resin composition composed of 11 parts by mass of cellulose, 10 parts by mass of maleic anhydride-modified polyethylene A, and 0.05 parts by mass of dialkyl peroxide A with respect to 100 parts by mass of the high-density polyethylene.

Example 9

A specimen as a molded article for measurement of the tensile strength was prepared in the same manner as in Example 1, except for changing the thermoplastic resin composition of Example 1 to a thermoplastic resin composition composed of 11 parts by mass of cellulose, 5 parts by mass of maleic anhydride-modified polyethylene A, and 0.01 parts by mass of dialkyl peroxide A with respect to 100 parts by mass of the high-density polyethylene.

Example 10

A specimen as a molded article for measurement of the tensile strength was prepared in the same manner as in Example 1, except for changing the thermoplastic resin composition of Example 1 to a thermoplastic resin composition composed of 11 parts by mass of cellulose, 5 parts by mass of maleic anhydride-modified polyethylene A, and 0.03 parts by mass of dialkyl peroxide A with respect to 100 parts by mass of the high-density polyethylene.

Example 11

A specimen as a molded article for measurement of the tensile strength was prepared in the same manner as in Example 1, except for changing the thermoplastic resin composition of Example 1 to a thermoplastic resin composition composed of 11 parts by mass of cellulose, 5 parts by mass of maleic anhydride-modified polyethylene A, and 0.12 parts by mass of dialkyl peroxide A with respect to 100 parts by mass of the high-density polyethylene.

Example 12

A specimen as a molded article for measurement of the tensile strength was prepared in the same manner as in Example 1, except for changing the thermoplastic resin composition of Example 1 to a thermoplastic resin composition composed of 43 parts by mass of cellulose, 5 parts by mass of maleic anhydride-modified polyethylene A, and 0.1 parts by mass of dialkyl peroxide A with respect to 100 parts by mass of the high-density polyethylene.

Example 13

A specimen as a molded article for measurement of the tensile strength was prepared in the same manner as in Example 1, except for changing the thermoplastic resin composition of Example 1 to a thermoplastic resin composition composed of 67 parts by mass of cellulose, 5 parts by mass of maleic anhydride-modified polyethylene A, and 0.1 parts by mass of dialkyl peroxide A with respect to 100 parts by mass of the high-density polyethylene.

Example 14

A specimen as a molded article for measurement of the tensile strength was prepared in the same manner as in Example 1, except for avoiding the use of maleic anhydride-modified polyethylene A in the thermoplastic resin composition of Example 1.

Examples 15 to 20

Specimens as a molded article for measurement of the tensile strength were prepared in the same manner as in Example 1, except for changing the kind of maleic anhydride-modified polyethylene A in the thermoplastic resin composition of Example 1 as shown in Table 2.

Example 21

A specimen as a molded article for measurement of the tensile strength was prepared in the same manner as in Example 1, except for changing the thermoplastic resin composition of Example 1 to a thermoplastic resin composition composed of 11 parts by mass of cellulose, 5 parts by mass of maleic anhydride-modified polyethylene A, and 0.1 parts by mass of peroxyketal with respect to 100 parts by mass of the high-density polyethylene.

Example 22

A specimen as a molded article for measurement of the tensile strength was prepared in the same manner as in Example 1, except for changing the thermoplastic resin composition of Example 1 to a thermoplastic resin composition composed of 11 parts by mass of cellulose, 5 parts by mass of maleic anhydride-modified polyethylene A, and 0.17 parts by mass of dialkyl peroxide B with respect to 100 parts by mass of the high-density polyethylene.

Example 23

A specimen as a molded article for measurement of the tensile strength was prepared in the same manner as in Example 1, except for changing the thermoplastic resin composition of Example 1 to a thermoplastic resin composition composed of 11 parts by mass of cellulose, 5 parts by mass of maleic anhydride-modified polyethylene A, and 0.30 parts by mass of a dialkyl peroxide with respect to 100 parts by mass of the high-density polyethylene.

Example 24

A specimen as a molded article for measurement of the tensile strength was prepared in the same manner as in Example 1, except for changing the thermoplastic resin composition of Example 1 to a thermoplastic resin composition composed of 11 parts by mass of cellulose, 5 parts by mass of maleic anhydride-modified polyethylene A, and 0.09 parts by mass of dialkyl peroxide C with respect to 100 parts by mass of the high-density polyethylene.

Example 25

A specimen as a molded article for measurement of the tensile strength was prepared in the same manner as in Example 1, except for changing the thermoplastic resin composition of Example 1 to a thermoplastic resin composition composed of 11 parts by mass of cellulose, 5 parts by mass of maleic anhydride-modified polyethylene A, and 0.16 parts by mass of alkylperoxy ester with respect to 100 parts by mass of the high-density polyethylene.

Example 26

A specimen as a molded article for measurement of the tensile strength was prepared in the same manner as in Example 1, except for changing the thermoplastic resin composition of Example 1 to a thermoplastic resin composition composed of 11 parts by mass of cellulose, 5 parts by mass of maleic anhydride-modified polyethylene A, and 0.14 parts by mass of monoperoxycarbonate with respect to 100 parts by mass of the high-density polyethylene.

Comparative Example 1

A specimen as a molded article for measurement of the tensile strength was prepared in the same manner as in Example 1, except for avoiding the use of maleic anhydride-modified polyethylene A and the organic peroxide in the thermoplastic resin composition of Example 1.

Comparative Example 2

A specimen as a molded article for measurement of the tensile strength was prepared in the same manner as in Example 1, except for avoiding the use of the organic peroxide.

The obtained results are shown collectively in Tables 1 to 5.

Meanwhile, the blank part of each material component in Tables indicates a case of "unused", or a case of "unevaluated" resulting from the case of "unused".

TABLE 1

| Item | Composition | Ex 1 | Ex 2 | Ex 3 | Ex 4 | Ex 5 | Ex 6 | Ex 7 |
|---|---|---|---|---|---|---|---|---|
| Base resin | HDPE | 100 | 100 | 100 | 100 | 100 | 100 | 100 |
| Cellulose | Pulp | 11 | 11 | 11 | 11 | 11 | 11 | 11 |
| Organic peroxide | Dialkyl peroxide A | 0.10 | 0.10 | 0.10 | 0.10 | 0.10 | 0.05 | 0.05 |
| | 1-minute half-life temperature [° C.] | 179.8 | 179.8 | 179.8 | 179.8 | 179.8 | 179.8 | 179.8 |
| Coupling agent | Maleic anhydride-modified polyethylene A | 1 | 2 | 3 | 5 | 10 | 2 | 5 |
| | MFR [g/10 min] | 9.0 | 9.0 | 9.0 | 9.0 | 9.0 | 9.0 | 9.0 |
| | Infrared spectrum relative intensity ratio | 0.15 | 0.15 | 0.15 | 0.15 | 0.15 | 0.15 | 0.15 |
| Evaluation | Tensile strength [MPa] | 52 | 57 | 52 | 60 | 54 | 52 | 51 |

Remarks: 'Ex' means Example according to this invention.

TABLE 2

| Item | Composition | Ex 8 | Ex 9 | Ex 10 | Ex 11 | Ex 12 | Ex 13 | Ex 14 |
|---|---|---|---|---|---|---|---|---|
| Base resin | HDPE | 100 | 100 | 100 | 100 | 100 | 100 | 100 |
| Cellulose | Pulp | 11 | 11 | 11 | 11 | 43 | 67 | 11 |
| Organic peroxide | Dialkyl peroxide A | 0.05 | 0.01 | 0.03 | 0.12 | 0.10 | 0.10 | 0.10 |
| | 1-minute half-life temperature [° C.] | 179.8 | 179.8 | 179.8 | 179.8 | 179.8 | 179.8 | 179.8 |
| Coupling agent | Maleic anhydride-modified polyethylene A | 10 | 5 | 5 | 5 | 5 | 5 | |
| | MFR [g/10 min] | 9.0 | 9.0 | 9.0 | 9.0 | 9.0 | 9.0 | |
| | Infrared spectrum relative intensity ratio | 0.15 | 0.15 | 0.15 | 0.15 | 0.15 | 0.15 | |
| Evaluation | Tensile strength [MPa] | 44 | 40 | 47 | 52 | 54 | 52 | 50 |

Remarks: 'Ex' means Example according to this invention.

TABLE 3

| Item | Composition | Ex 15 | Ex 16 | Ex 17 | Ex 18 | Ex 19 | Ex 20 |
|---|---|---|---|---|---|---|---|
| Base resin | HDPE | 100 | 100 | 100 | 100 | 100 | 100 |
| Cellulose | Pulp | 11 | 11 | 11 | 11 | 11 | 11 |
| Organic peroxide | Dialkyl peroxide A | 0.1 | 0.1 | 0.1 | 0.1 | 0.1 | 0.1 |
| | 1-minute half-life temperature [° C.] | 179.8 | 179.8 | 179.8 | 179.8 | 179.8 | 179.8 |
| Coupling agent | Maleic anhydride-modified polyethylene B | 5 | | | | | |
| | Maleic anhydride-modified polyethylene C | | 5 | | | | |

TABLE 3-continued

| Item | Composition | Ex 15 | Ex 16 | Ex 17 | Ex 18 | Ex 19 | Ex 20 |
|---|---|---|---|---|---|---|---|
| | Maleic anhydride-modified polyethylene D | | | 5 | | | |
| | Maleic anhydride-modified polyethylene E | | | | 5 | | |
| | Maleic anhydride-modified polyethylene F | | | | | 5 | |
| | Maleic anhydride-modified polyethylene G | | | | | | 5 |
| | MFR [g/10 min] | 0.4 | 3.4 | 4.4 | 1.3 | 1.2 | 1.1 |
| | Infrared spectrum relative intensity ratio | 0.14 | 0.10 | 0.16 | 0.17 | 0.16 | 0.12 |
| Evaluation | Tensile strength [MPa] | 57 | 56 | 56 | 59 | 59 | 58 |

Remarks: 'Ex' means Example according to this invention.

TABLE 4

| Item | Composition | Ex 21 | Ex 22 | Ex 23 | Ex 24 | Ex 25 | Ex 26 |
|---|---|---|---|---|---|---|---|
| Base resin | HDPE | 100 | 100 | 100 | 100 | 100 | 100 |
| Cellulose | Pulp | 11 | 11 | 11 | 11 | 11 | 11 |
| Organic peroxide | Peroxyketal | 0.10 | | | | | |
| | Dialkyl peroxide B | | 0.17 | | | | |
| | Diacylperoxide | | | 0.30 | | | |
| | Dialkyl peroxide C | | | | 0.09 | | |
| | Alkylperoxy ester | | | | | 0.16 | |
| | Monoperoxycarbonate | | | | | | 0.14 |
| | 1-minute half-life temperature [° C.] | 153.8 | 175.2 | 130 | 185.9 | 159.9 | 155 |
| Coupling agent | Maleic anhydride-modified polyethylene A | 5 | 5 | 5 | 5 | 5 | 5 |
| | MFR [g/10 min] | 9.0 | 9.0 | 9.0 | 9.0 | 9.0 | 9.0 |
| | Infrared spectrum relative intensity ratio | 0.15 | 0.15 | 0.15 | 0.15 | 0.15 | 0.15 |
| Evaluation | Tensile strength [MPa] | 55 | 57 | 51 | 57 | 56 | 53 |

Remarks: 'Ex' means Example according to this invention.

TABLE 5

| Item | Composition | CEx 1 | CEx 2 |
|---|---|---|---|
| Base resin | HDPE | 100 | 100 |
| Cellulose | Pulp | 11 | 11 |
| Organic peroxide | Dialkyl peroxide A | | |
| | Peroxyketal | | |
| | Dialkyl peroxide B | | |
| | Diacylperoxide | | |
| | Dialkyl peroxide C | | |
| | Alkylperoxy ester | | |
| | Monoperoxycarbonate | | |
| Coupling agent | Maleic anhydride-modified polyethylene A | | 5 |
| | MFR [g/10 min] | | 9.0 |
| | Infrared spectrum relative intensity ratio | | 0.15 |
| Evaluation | Tensile strength [MPa] | 33 | 35 |

Remarks:
'CEx' means Comparative Example.

From the above Tables 1 to 5, it is apparent that the cellulose-reinforced thermoplastic resin compositions of Examples 1 to 26 according to the present invention achieved 40 MPa or more of the tensile strength measured in conformity with JIS K7161, and enabled to obtain the 40 MPa or more of the tensile strength easily and at an inexpensive production cost, as compared to the cellulose-reinforced thermoplastic resin compositions of Comparative Examples 1 and 2.

Because the cellulose-reinforced thermoplastic resin compositions of Examples 1 to 26 according to the present invention is improved in the tensile strength, whereby reinforcement efficiency of the cellulose-reinforced thermoplastic resin composition is increased, and the cellulose-reinforced thermoplastic resin compositions can be produced easily and at an inexpensive production cost, it is found that the cellulose-reinforced thermoplastic resin composition according to the present invention is useful for a variety of molded articles of the cellulose-reinforced resin.

The invention claimed is:

1. A thermoplastic resin composition, comprising:
   a polyethylene resin;
   a cellulose in the content of 10 to 70 parts by mass with respect to 100 parts by mass of the polyethylene resin; and
   an organic peroxide in the content of 0.006 to 0.009 part by mass with respect to 100 parts by mass of the total content of the polyethylene resin and the cellulose,
   wherein the tensile strength of a resin composed of the thermoplastic resin composition measured in conformity with JIS K7161 is 40 MPa or more, and
   the cellulose is plant fiber-derived kraft pulp.

2. The thermoplastic resin composition according to claim 1, wherein the polyethylene resin contains an unsaturated carboxylic acid- or its anhydride-graft modified polyethylene resin.

3. The thermoplastic resin composition according to claim 1, wherein the 1-minute half-life temperature of the organic peroxide is 130 to 190° C.

4. The thermoplastic resin composition according to claim 1, wherein the organic peroxide is at least one kind of organic peroxide selected from a dialkyl peroxide, a peroxyketal, a diacylperoxide, an alkylperoxy ester and a monoperoxycarbonate.

5. The thermoplastic resin composition according to claim 1, wherein the polyethylene resin contains an unsaturated carboxylic acid- or its anhydride-graft modified polyethylene resin; and
wherein the unsaturated carboxylic acid- or its anhydride-graft modified polyethylene resin is a maleic anhydride-modified polyethylene resin.

6. The thermoplastic resin composition according to claim 1, wherein the polyethylene resin is a mixed resin of:
an unsaturated carboxylic acid- or its anhydride-graft modified polyethylene resin, and
a polyethylene resin which is not modified with an unsaturated carboxylic acid or its anhydride.

7. A cellulose-reinforced thermoplastic resin composition, comprising an ester-linked composite resin in which a hydroxyl group of a cellulose and a polyethylene resin provided with a cross-linking structure having a carboxylic group are esterified,
wherein the content of the cellulose component in the composite resin is from 9.1 to 41% by mass,
the tensile strength of a resin composed of the cellulose-reinforced thermoplastic resin composition measured in conformity with JIS K7161 is 40 MPa or more,
an organic peroxide is used in the composition as a radical polymerization initiator,
the content of the organic peroxide is 0.006 to 0.009 part by mass with respect to 100 parts by mass of the total content of the polyethylene resin and the cellulose, and
the cellulose is plant fiber-derived kraft pulp.

8. The cellulose-reinforced thermoplastic resin composition according to claim 7, wherein the polyethylene resin provided with a cross-linking structure having a carboxylic group is a polyethylene resin provided with a cross-linking structure in which the carbon atoms in the main chain of an unsaturated carboxylic acid- or its anhydride-graft modified polyethylene and the carbon atoms in the main chain of a polyethylene resin which is not modified with an unsaturated carboxylic acid or its anhydride are bound at two or more sites.

9. The cellulose-reinforced thermoplastic resin composition according to claim 8, wherein a polyethylene resin prior to modification of the unsaturated carboxylic acid- or its anhydride-graft modified polyethylene resin and the polyethylene resin which is not modified with an unsaturated carboxylic acid or its anhydride are a different polyethylene resin from each other.

10. A method of producing a cellulose-reinforced thermoplastic resin composition, comprising subjecting the thermoplastic resin composition according to claim 1 to a heat kneading, thereby reacting components contained therein.

11. A molded article of a cellulose-reinforced resin, comprising an ester-linked composite resin in which a hydroxyl group of a cellulose and a polyethylene resin provided with a cross-linking structure having a carboxylic group are esterified,
wherein the content of the cellulose component in the composite resin is from 9.1 to 41% by mass,
the tensile strength of the molded article of a cellulose-reinforced resin measured in conformity with JIS K7161 is 40 MPa or more,
an organic peroxide is used as a radical polymerization initiator, and the content of the organic peroxide is 0.006 to 0.009 part by mass with respect to 100 parts by mass of the total content of the polyethylene resin and the cellulose, and
the cellulose is plant fiber-derived kraft pulp.

12. A method of producing a molded article composed of a cellulose-reinforced resin, comprising employing the cellulose-reinforced thermoplastic resin composition according to claim 7, and subjecting it to molding.

13. A method of producing a molded article composed of a cellulose-reinforced resin, comprising employing a cellulose-reinforced thermoplastic resin composition produced by the method of producing a cellulose-reinforced thermoplastic resin composition according to claim 10, and subjecting it to molding.

14. A molded article of a cellulose-reinforced resin, which is obtained by molding the thermoplastic resin composition according to claim 1.

15. The molded article of a cellulose-reinforced resin according to claim 14, wherein an application of the molded article is a material for a vehicle.

16. The molded article of a cellulose-reinforced resin according to claim 11, wherein the molded article is a door trim, a pillar, an instrumental panel, a console, a rocker panel, an armrest, an inner panel of door, a spare tire cover, a door knob, a bumper, a spoiler, a fender, a side step, an outer panel of door, an air intake duct, a coolant reserve tank, a radiator reserve tank, a window-washer tank, a fender liner, a fan, or a front-end panel.

17. The molded article of a cellulose-reinforced resin according to claim 14, wherein an application of the molded article is a material for a vehicle.

18. The molded article of a cellulose-reinforced resin according to claim 14, wherein the molded article is a door trim, a pillar, an instrumental panel, a console, a rocker panel, an armrest, an inner panel of door, a spare tire cover, a door knob, a bumper, a spoiler, a fender, a side step, an outer panel of door, an air intake duct, a coolant reserve tank, a radiator reserve tank, a window-washer tank, a fender liner, a fan, or a front-end panel.

* * * * *